(12) United States Patent
Frank

(10) Patent No.: US 8,300,787 B2
(45) Date of Patent: *Oct. 30, 2012

(54) SELECTIVE UNBLOCKING OF CALLER ID BASED ON SECURITY LEVEL

(75) Inventor: Edward H. Frank, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/762,728

(22) Filed: Apr. 19, 2010

(65) Prior Publication Data

US 2010/0202601 A1  Aug. 12, 2010

Related U.S. Application Data

(63) Continuation of application No. 11/239,928, filed on Sep. 29, 2005, now Pat. No. 7,702,089.

(60) Provisional application No. 60/621,579, filed on Oct. 22, 2004.

(51) Int. Cl.
*H04M 1/56* (2006.01)

(52) U.S. Cl. ............... 379/142.02; 379/201.02

(58) Field of Classification Search ............ 379/142.02, 379/142.03, 142.01, 142.1; 455/415
See application file for complete search history.

(56) References Cited

U.S. PATENT DOCUMENTS

| | | | | |
|---|---|---|---|---|
| 5,161,181 A * | 11/1992 | Zwick | ......................... | 379/88.2 |
| 5,341,411 A * | 8/1994 | Hashimoto | ................ | 379/88.19 |
| 5,412,711 A | 5/1995 | Hayashi | | |
| 5,426,693 A * | 6/1995 | Rosen | ...................... | 379/142.02 |
| 5,497,414 A | 3/1996 | Bartholomew | | |
| 5,590,184 A * | 12/1996 | London | ..................... | 379/142.09 |
| 5,642,414 A * | 6/1997 | Kazemzadeh | ................ | 379/377 |
| 5,790,647 A * | 8/1998 | Gessel | ....................... | 379/216.01 |
| 5,796,810 A * | 8/1998 | Lim et al. | ................. | 379/142.02 |
| 5,864,612 A * | 1/1999 | Strauss et al. | ............ | 379/142.03 |
| 6,343,120 B1 * | 1/2002 | Rhodes | .................... | 379/142.01 |
| 6,496,569 B2 | 12/2002 | Pelletier et al. | | |
| 6,553,110 B1 * | 4/2003 | Peng | ....................... | 379/210.03 |
| 6,721,406 B1 * | 4/2004 | Contractor | ............. | 379/142.06 |
| 6,766,002 B1 | 7/2004 | Cannon et al. | | |
| 6,788,775 B1 | 9/2004 | Simpson | | |
| 7,085,578 B2 * | 8/2006 | Barclay et al. | ................ | 455/457 |
| 7,260,197 B2 | 8/2007 | Smith | | |
| 7,353,035 B1 * | 4/2008 | Kupsh et al. | .................. | 455/466 |
| 7,546,117 B2 * | 6/2009 | Lewis et al. | ................... | 455/418 |
| 7,702,089 B2 | 4/2010 | Frank | | |
| 2001/0055376 A1 * | 12/2001 | Karas | ....................... | 379/142.02 |
| 2002/0128033 A1 | 9/2002 | Burgess | | |
| 2003/0039344 A1 * | 2/2003 | Mercer | .................... | 379/142.01 |
| 2003/0220097 A1 * | 11/2003 | Aono et al. | .................... | 455/410 |
| 2006/0094404 A1 | 5/2006 | Burgess | | |
| 2007/0041545 A1 | 2/2007 | Gainsboro | | |
| 2007/0293205 A1 | 12/2007 | Henderson | | |

* cited by examiner

*Primary Examiner* — Olisa Anwah
(74) *Attorney, Agent, or Firm* — Sterne, Kessler, Goldstein & Fox P.L.L.C.

(57) ABSTRACT

A system for selectively blocking and unblocking the sending of outgoing caller ID information from a communication device comprises a communication device, a processor coupled to the communication device and a storage medium coupled to the processor containing a directory of information entries. The information entries include both telephone numbers and associated security levels. When a call is placed to a number using the communication device, the processor seeks the number in the directory of the storage medium. If an entry is found for the number by the processor, caller ID information is prevented from being sent to the number unless a security level associated with the number is at or above a predefined cut-off level.

45 Claims, 5 Drawing Sheets

SELECTIVE UNBLOCKING OF CALLER ID BASED ON SECURITY LEVEL

CROSS REFERENCE TO RELATED APPLICATIONS

This application is a continuation of U.S. patent application Ser. No. 11/239,928, filed Sep. 29, 2005, which in turn claims priority to and the benefit of U.S. Provisional Application No. 60/621,579, filed Oct. 22, 2004, all of which are incorporated herein by reference in their entirety.

BACKGROUND OF THE INVENTION

1. Field of the Invention

The present invention is directed to the field of telephony generally, and to a method and device for blocking outgoing caller ID information specifically.

2. Background Art

Cellular communication systems are multi-user, wireless communication systems capable of concurrent use by large numbers of users. These systems may be packet wireless communication systems providing voice and other real time communications between mobile terminals operable in such a system. Advancements in communication technologies have permitted the development and popularization of new types of mobile devices for use with cellular communication systems.

With the advancing sophistication of mobile devices and standard telephony services in general, there is an ever-increasing array of services available which may be provided on mobile devices, including cellphones, PDAs and the like. One such service is a caller ID service for voice devices, where a mobile or other phone (which may be a standard phone coupled to a landline) is identified to the phone of the recipient of the call. For communication devices so enabled, the incoming call number can be displayed before the call is picked up by the recipient, allowing a user of such a system to screen unwanted incoming calls. Furthermore, current mobile phones commonly feature onboard telephone directories which are automatically accessed when a call is received to attempt to match a name with the incoming number when displaying caller ID information.

However, in some situations, a caller may not wish her information displayed in such a manner on the phone of the recipient of the call. Accordingly, caller ID blocking methods are known which allow a caller to prevent her caller ID information from being sent to the call's recipient. However, these methods are tedious and unwieldy in that they either result in all caller ID information being blocked during the period in which they operate, or an action must be taken by a caller before each call to enable blocking of the outgoing caller ID information.

What is needed is a more sophisticated system of blocking outgoing caller ID information that takes full advantage of current telephone device technologies to selectively block outgoing caller ID information for calls to certain numbers only.

BRIEF SUMMARY OF THE INVENTION

A system for selectively blocking and unblocking the sending of outgoing caller ID information from a communication device includes a communication device, a processor coupled to the communication device and a storage medium coupled to the processor containing a directory of information entries. The information entries include a plurality of stored telephone numbers and associated security levels. When a call is placed to a predetermined telephone number using the communication device, the processor seeks to match the predetermined telephone number with a corresponding one of the stored telephone numbers in the directory of the storage medium. If a match is found for the predetermined telephone number by the processor, a caller ID information is prevented from being sent to a recipient associated with the predetermined telephone number unless at least one of the security levels associated with the predetermined telephone number is at or above a predefined cut-off level. It is understood by one skilled in that art that the communications device may include a wireless or wired telephone device, a PDA device or any other device capable of sending caller ID information.

In an alternative embodiment, a method for selectively blocking the sending of outgoing caller ID information includes placing a call to a predetermined telephone number and searching a directory for a match to the predetermined telephone number called, wherein entries in the directory include a plurality of stored telephone numbers and associated security levels, and wherein each of the security levels is itself associated with at least one parameter having conditions which must be met so that the at least one parameter may be satisfied. The method further includes blocking an outgoing caller ID information from being sent to a recipient associated with the predetermined telephone number unless the at least one parameter associated with the predetermined telephone number has been satisfied.

BRIEF DESCRIPTION OF THE DRAWINGS/FIGURES

Figure 1:
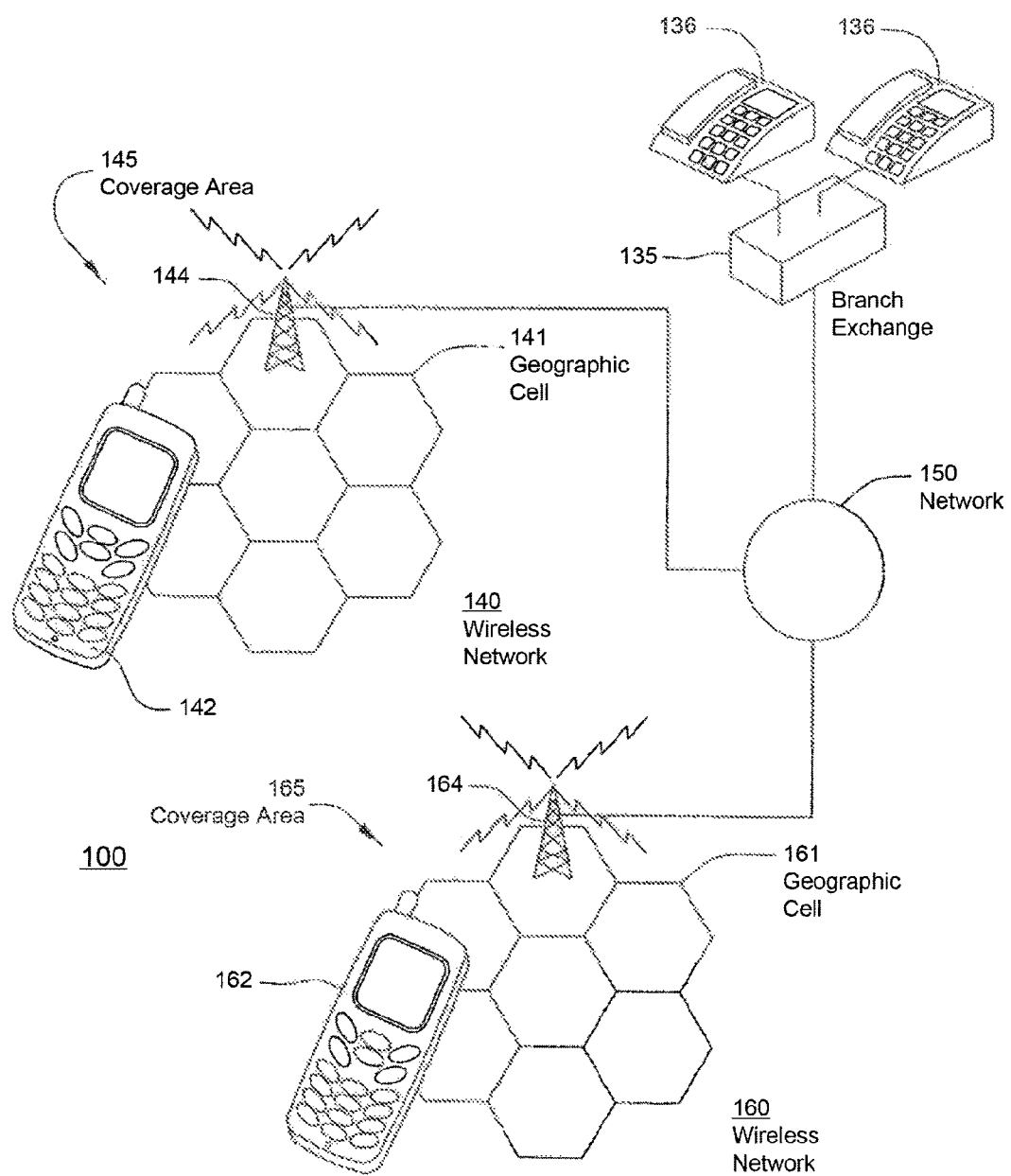
FIG. 1 shows a standard telephone network architecture.

Before any embodiment of the invention is explained in detail, it is to be understood that the invention is not limited in its application to the details of construction and arrangements of components set forth in the following description, or illustrated in the drawings. The invention is capable of alternative embodiments and of being practiced or being carried out in various ways. Also, it is to be understood that the terminology used herein is for the purpose of illustrative description and should not be regarded as limiting.

DETAILED DESCRIPTION OF THE INVENTION

In FIG. 1, a conventional network architecture 100 is shown in which a first wireless network 160 and a second wireless network 140 are coupled by a network 150. In addition, telephones 136 may be coupled to the network 150 through a branch exchange 135. The network architecture 100 as a whole permits communication between a mobile device 162 such as a mobile phone or a PDA device associated with either of the first and second wireless networks 160 and 140 with another mobile device, the telephones 136, or any other telephone device coupled to the network architecture 100. Exemplary embodiments of the present invention can be applied to the network architecture of FIG. 1, as well as to other suitable architectures.

In one embodiment, the network 150 may provide POTS telephony services over a Public Switched Telephone Network (PSTN). In alternative embodiments, the network 150 is additionally a circuit or packet switched public data network, or additionally provides higher speed data services over an integrated services digital network. It will be understood by one skilled in the art that many embodiments are possible for the network 150.

Each of the first and second wireless networks 160 and 140 includes one or more base stations 164, 144 for communicating with mobile devices 162, 142. The mobile device 162, 142 may be any device adapted for voice communications with the wireless networks 160, 140, including cellular telephones, certain personal digital assistants, etc.

With reference to the first wireless network 160, transmission and reception between the base stations 164 and the mobile devices 162 occur in a defined coverage area 165 broken into individual geographic cells 161, each having its own base station 164. The one or more base stations 164 include radio transceivers defining each geographic cell 161 and providing radio-link protocols to the mobile devices 162. A controller (not shown) may also be coupled between the one or more base stations 164 and a switching center (not shown) to manage and efficiently allocate radio resources for the one or more base stations 164. The controller handles handovers, radio-channel setup and frequency hopping for the mobile devices 162, for instance as they move from one geographic cell 161 to another. As is known to one skilled in the art, the foregoing descriptions are equally applicable to the second wireless network 140 and its base stations 144, mobile devices 142, geographic cells 141 and coverage area 145.

Communication between the base stations 164 and the mobile devices 162 may utilize multi-access wireless communications protocols such as general packet radio services, global system for mobile communications and universal mobile telecommunications system protocols, as well as others. In alternative embodiments, High Data Rate (HDR), wideband Code Division Multiple Access (WCDMA) and/or Enhanced Data Rates for GSM Evolution (EDGE) may also be supported.

Figure 2:
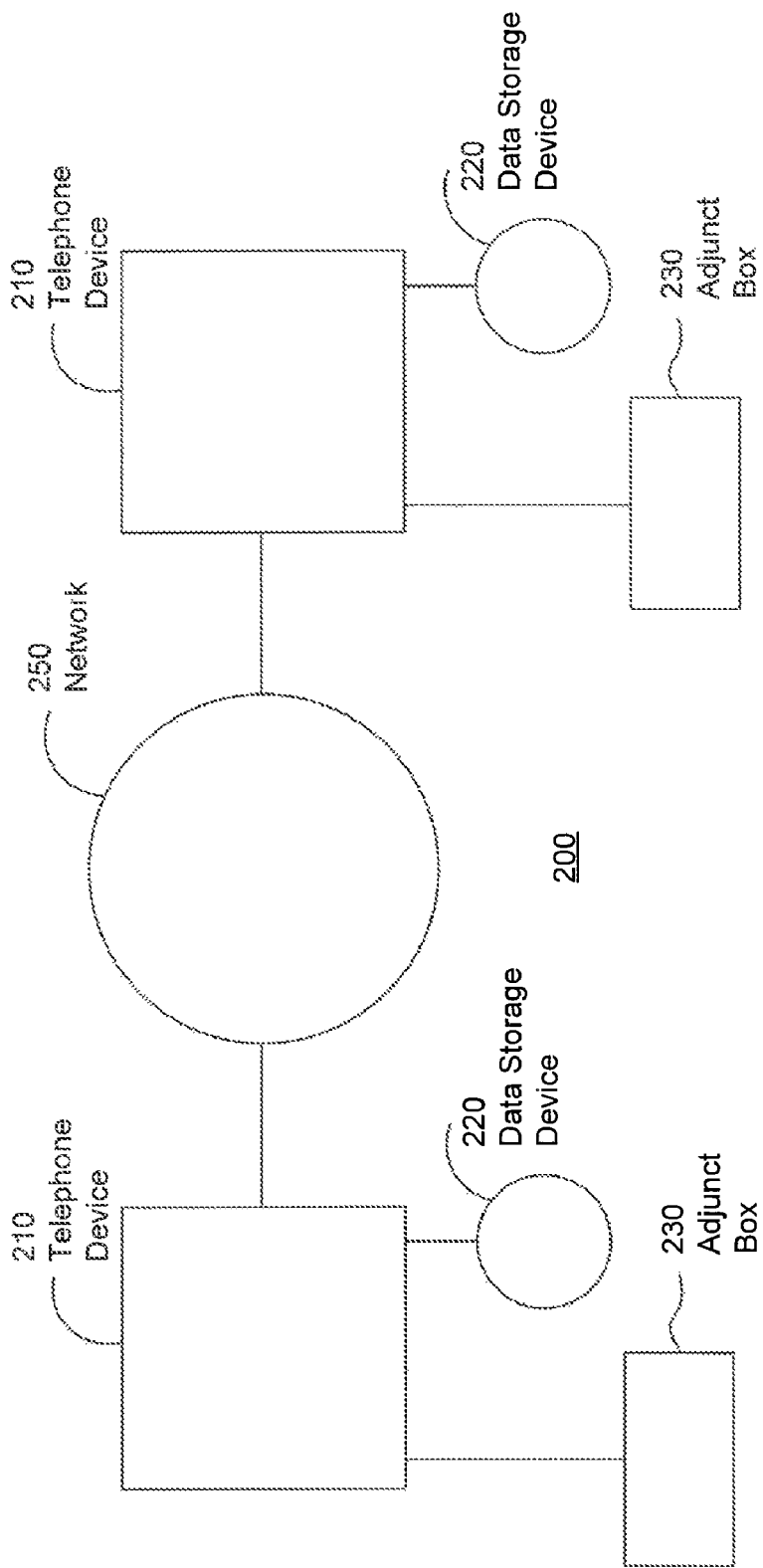
FIG. 2 shows a simplified telephone network architecture.

Referring now to FIG. 2, a simplified telephone network architecture 200 is shown wherein a pair of telephone devices 210 are coupled by a network 250. The telephone devices 210 are provided with data storage devices 220. In an exemplary embodiment of the present invention, the data storage devices 220 are smartcards, more specifically Subscriber Identity Modules ("SIMs"). The data storage device 220 may contain caller personal data of a user of the telephone device 210, including the user's telephone directory.

The simplified telephone network architecture 200 may be used to transmit caller ID data to a user of one of the telephone devices 210 from the user of the other of the telephone devices 210. Caller ID is a feature whereby data is associated with an incoming telephone call to provide to the called party some information regarding the calling party, in particular, information regarding the calling party's telephone, such as the source number of the call. In an alternative embodiment, additional information may be provided as part of the caller ID information such as, for example, location information of the phone from which the call was placed. This information may be obtained using known global positioning system ("GPS") technology incorporated within the telephone.

The called party uses an adjunct box 230 coupled to the telephone devices 210 to display the caller ID information. The adjunct box 230 typically has a liquid crystal display that provides the called party with the information as the incoming call is being received. In the United States, the caller ID information is typically provided between the first ring signal and the second ring signal. Where the telephone device 210 receiving the call is a mobile device, the functionality of the adjunct box will typically be incorporated within the casing of the mobile device itself.

An attribute of the caller ID feature is that it enables a called party to screen incoming calls by determining, based on the information presented, whether the called party wants to take time to engage in a conversation with the incoming caller, or to have the call go unanswered or forwarded to an answering machine. An additional advantage is that the called party can benefit from a record of the stored caller ID data to use as a simple look-up device when returning a call to the incoming caller.

However, in some situations a calling party may not want her caller ID data to be transmitted to the called party. As such, current telephone devices allow a caller to block transmission of this information by, for example, entering a numeric sequence on the keypad of the phone. However, this must be selectively performed for each call or for all calls.

In an exemplary embodiment of the present invention, a system and method are provided for selectively and automatically blocking the transmission of caller ID data to particular called parties. The data storage device 220 containing caller personal data of a user of the telephone device 210, including the user's telephone directory, also contains security level information for each entry in the user's telephone directory. As such, when a call is placed using the telephone device 210, the called number is compared against the data storage device 220. If an entry is found, caller ID information will be blocked for that call unless the security level for that entry is above a cut-off level. If an entry is not found, caller ID information will be blocked or not blocked based on a default setting.

Figure 3:
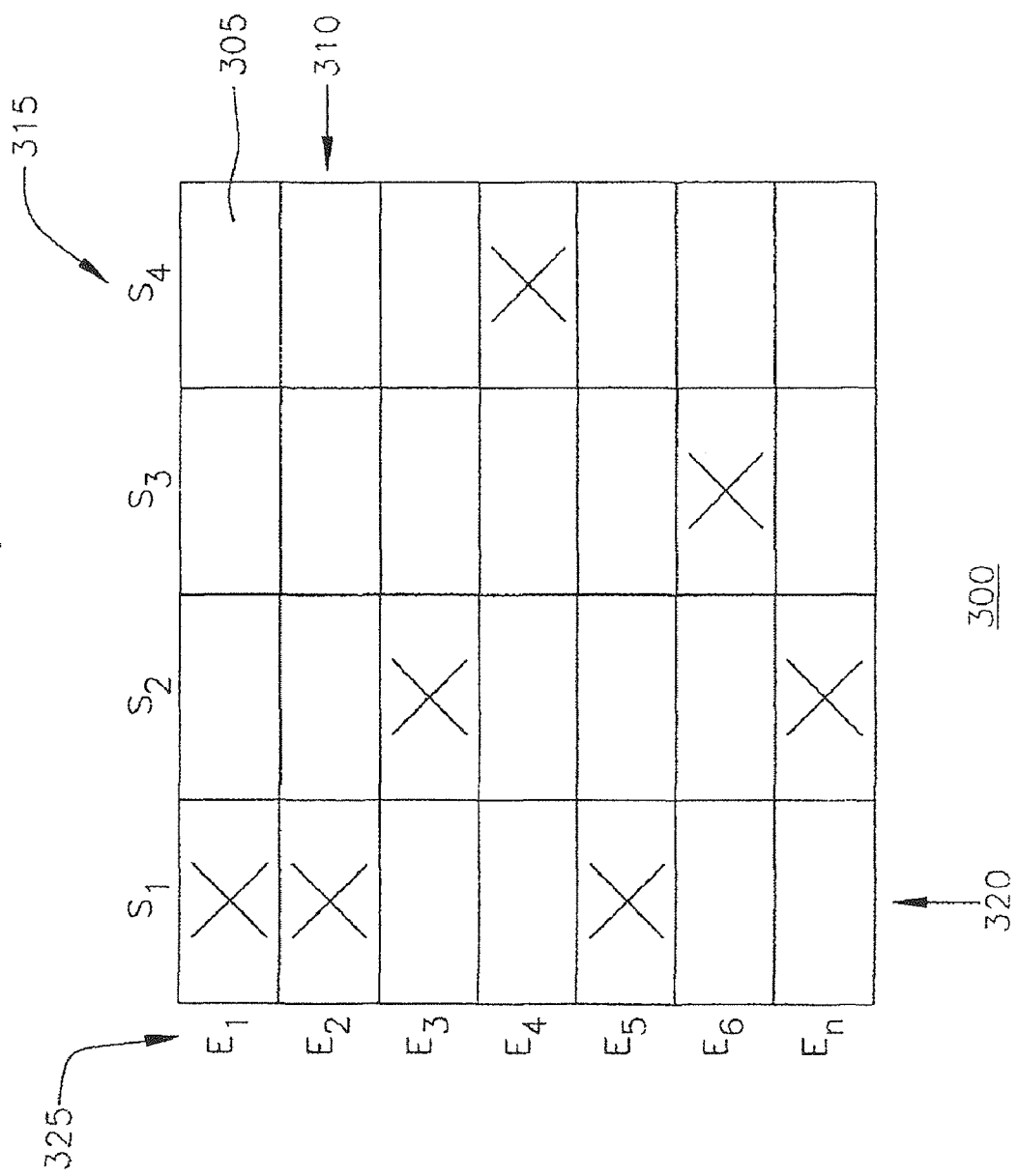
FIG. 3 is a matrix defining a contact list having multiple security levels.

FIG. 3 is a conceptual diagram of the database in the data storage device 220 containing a user's telephone directory and associated security level information. A telephone directory 300 is shown having one or more directory entries 325 containing at least a phone number. One or more security levels 315 are provided that are assignable to the directory entries 325. Accordingly, a selection is made along the matrix rows 310 and matrix columns 320 such that an entry in a particular cell 305 indicates the corresponding security level 315 has been chosen for the corresponding directory entry 325.

Figure 4:
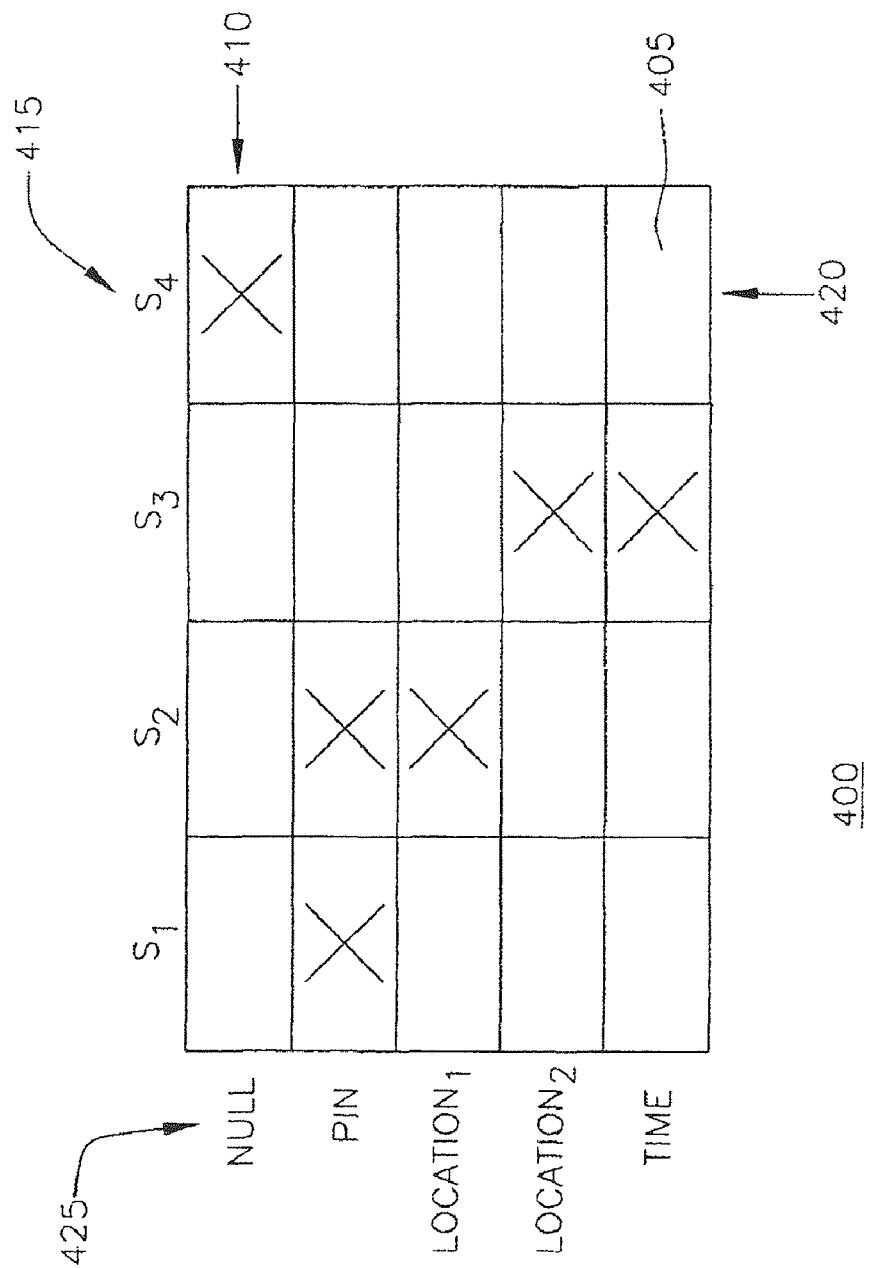
FIG. 4 is a dynamic security matrix showing under what conditions each security level of FIG. 2 is set to unblock outgoing caller ID information.

In a further embodiment of the present invention, rather than have a predefined cut-off security level at and above which caller ID information is sent and below which it is blocked, a dynamic security level matrix 400 is provided as shown in FIG. 4, showing the conditions necessary for each security level 415, to allow caller ID information. Individual security levels 415 arranged in matrix columns 420 are matched with parameters 425 arranged in matrix rows 410. An entry in a cell 405 indicates that the associated parameter 425 must be satisfied before a call to a directory entry bearing the associated security level may have its caller ID information unblocked.

For example, in the exemplary embodiment shown in FIG. 4, it is shown that a security level $S_1$ requires that a PIN be entered in the telephonic device before caller ID information may be unblocked. A second, more restrictive security level $S_2$ requires both the entry of the PIN and that the telephone device be in a first predefined location. The physical location of the telephone device as a parameter 425 may be provided by known GPS technology incorporated within the telephone device such that the parameter 425 is satisfied only when the telephone device is in one of a set of predefined geographic locations.

A third security level $S_3$ requires that the telephone device be in a second predefined location, as well as that the local time be within a certain interval, before caller ID information may be unblocked.

In the exemplary embodiment shown in FIG. 4, a fourth, least restrictive security level $S_4$ is assigned a null parameter 425. As such, calls to numbers assigned this fourth security level will always allow caller ID information to be sent to a recipient of the call.

In alternative embodiments, the range of parameters 425 may include the entry of one or more PIN codes, biometric data such as a thumbprint, voice analysis, the physical location of the telephone device? the time of day, proximity to or use of an enabling device such as a magnetically encoded card, radio frequency identification tag, and the like. This list is not inclusive, and it will be apparent to one skilled in the art that other embodiments of the invention are possible featuring additional parameters 425. Just one or more than one parameter 425 may be selected for each security level 415. A separate parameter 425 may be used for several different security levels 415, or it may be used just once.

The application of the aforementioned parameters 425 has been discussed in the conjunctive, such that for a particular security level 415, each parameter 425 designated therefor must be satisfied so that caller ID information may be sent. However, it is understood that in an alternative embodiment, these parameters 425 may be applied in the disjunctive, such that the satisfaction of anyone parameter designated for a particular security level enables sending of caller ID data under that security level.

Figure 5:
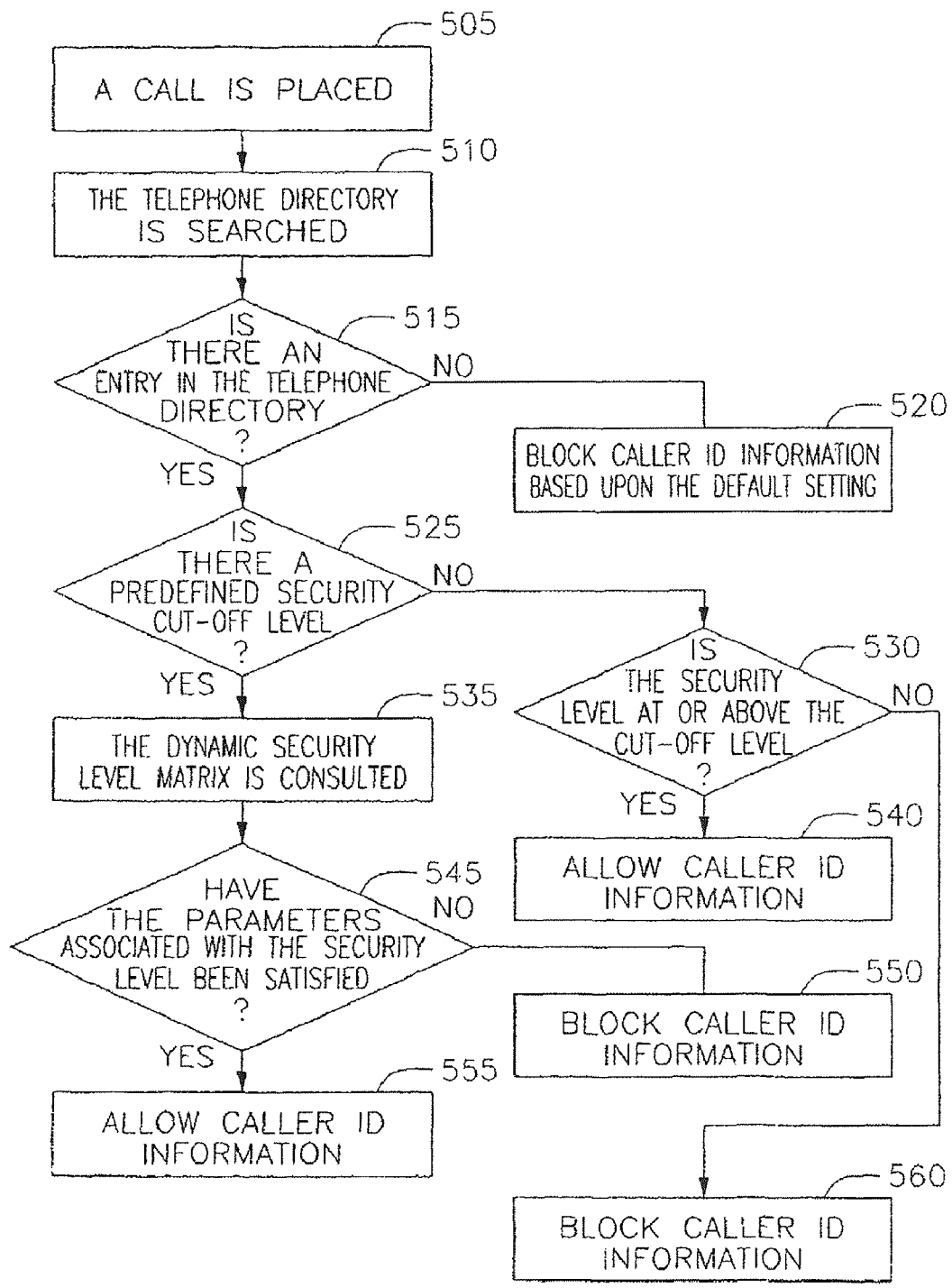
FIG. 5 is a flowchart representative of one embodiment of operations pursuant to aspects of the invention.

In general, according to the foregoing an exemplary embodiment of the present invention provides a method for selectively blocking and unblocking the sending of outgoing caller ID information from a telephone as diagrammed in the block flow diagram of FIG. 5. At block 500, a telephone call is placed. Then, at block 510, the telephone directory is searched. At block 515, if there is an entry in the telephone directory, the process moves to block 525. Otherwise, caller ID information is blocked based on the default setting discussed above at block 520.

At block 525, if there is a predefined security cut-off level, the process moves to block 530. If not, the dynamic security level matrix is consulted at block 535. At block 530, if the security level is at or above the cut-off level, caller ID information is permitted to be sent to the recipient of the telephone call at block 540. Otherwise, caller ID information is blocked from being sent to the recipient of the telephone call at block 560.

Once the dynamic security level matrix has been consulted at block 535, the process moves to block 545 where, if the parameters associated with the security level in the dynamic security level matrix have been satisfied, caller ID information is permitted to be sent to the recipient of the telephone call at block 555. Otherwise, caller ID information is blocked from being sent to the recipient of the telephone call at block 550.

In an alternative embodiment of the present invention, the telephone devices 210 of FIG. 2 may further include a Hardware Security Module ("HSM"), which is a dedicated chip providing encryption and decryption capabilities. Data stored in the data storage devices 220, such as a user's telephone directory and other personal information, could be stored in an encrypted state, and decrypted only when needed using the HSM chip.

Embodiments of exemplary Hardware Security Modules are provided in co-pending provisional patent application Ser. No. 60/615,290, entitled Stateless Hardware Security Module, filed on Oct. 1, 2004, now filed as patent application Ser. Nos. 11/159,640, filed Jun. 21, 2005, and 11/159,669, filed Jun. 21, 2005, and assigned to the assignee of the present application, the entire contents of which are incorporated herein by reference.

Furthermore, it will be apparent to one skilled in the art that while a system using SIM devices and a GSM mobile network has been described herein, the inventive concepts described above would be equally applicable to systems that use other types of smartchips and/or other types of mobile networks.

What is claimed is:

1. A system, comprising:
a processor configured to:
receive a telephone number associated with an outbound call,
determine a match between the telephone number and a stored telephone number in a directory of stored telephone numbers, and
if a match is successful, block caller ID information from being transmitted with the outbound call unless a condition associated with the matching stored telephone number is satisfied, the condition being based on a plurality of parameters associated with the matching stored telephone number.

2. The system of claim 1, further comprising:
a storage medium coupled to the processor, wherein the directory of stored telephone numbers is stored in the storage medium.

3. The system of claim 2, further comprising:
a hardware security module coupled to the storage medium, wherein the hardware security module is configured to store the directory of stored telephone numbers in the storage medium in an encrypted state.

4. The system of claim 1, further comprising:
a communication device coupled to the processor, wherein the outbound call is placed by the communication device.

5. The system of claim 4, wherein the communication device is a mobile phone, a wired phone or a personal digital assistant (PDA).

6. The system of claim 1, further comprising:
a subscriber identity module coupled to the processor, wherein the directory of stored telephone numbers is stored in the subscriber identity module.

7. The system of claim 1, wherein the caller ID information comprises a telephone number of a calling party.

8. The system of claim 1, wherein the caller ID information comprises a telephone number of a calling party and a geographic location of the calling party.

9. The system of claim 1, wherein the processor is further configured to:
block caller ID information from being transmitted with the outbound call if a match is not determined.

10. The system of claim 1, wherein the condition includes a requirement that at least one parameter of the plurality of parameters associated with the matching stored telephone number be satisfied.

11. The system of claim 1, wherein the condition includes a requirement that all of the plurality of parameters associated with the matching stored telephone number be satisfied.

12. The system of claim 1, wherein the condition includes a requirement that a security level parameter associated with the matching stored telephone number satisfies a predefined cut-off level.

13. The system of claim 1, wherein the condition is an entry of a PIN number.

14. The system of claim 1, wherein the condition includes a requirement that a geographic position of the processor satisfy a predefined geographic location.

15. The system of claim 1, wherein the condition includes a requirement that a geographic position of the processor satisfy a predefined geographic location and a time of the outbound call is within a certain time interval.

16. The system of claim 1, wherein the condition includes a requirement that biometric data be satisfied.

17. The system of claim 1, wherein the condition includes a requirement that proximity of an enabling device be satisfied.

18. The system of claim 1, wherein the processor is further configured as a default setting to block caller ID information from being transmitted with the outbound call if the match between the telephone number and a stored telephone number is not successful.

19. The system of claim 1, wherein the processor is further configured as a default setting to allow caller ID information to be transmitted with the outbound call if the match between the telephone number and a stored telephone number is not successful.

20. The system of claim 1, wherein the caller ID information includes a telephone number associated with the processor.

21. The system of claim 1, wherein the caller ID information includes location information associated with the processor.

22. The system of claim 21, wherein the location information associated with the processor is received from a GPS device.

23. A method, comprising:
receiving a telephone number associated with an outbound call,
determining a match between the telephone number and a directory of stored telephone numbers, and
if the match is successful, blocking caller ID information from being transmitted with the outbound call unless a condition associated with the matching stored telephone number is satisfied, the condition being based on a plurality of parameters associated with the matching stored telephone number.

24. The method of claim 23, further comprising:
storing the directory of stored telephone numbers in a storage medium.

25. The method of claim 24, wherein the storing the directory of stored telephone numbers includes using a hardware security module to store the directory of stored telephone numbers in an encrypted state in the storage medium.

26. The method of claim 23, further comprising:
placing the outbound call using a communication device.

27. The method of claim 26, wherein the placing the outbound call using a communication device includes placing the outbound call using a mobile phone, a wired phone or a personal digital assistant (PDA).

28. The method of claim 23, further comprising:
storing the directory of stored telephone numbers in a subscriber identity module.

29. The method of claim 23, wherein the blocking the caller ID information includes blocking a telephone number of a calling party.

30. The method of claim 23, wherein the blocking the caller ID information includes blocking a telephone number of a calling party and a geographic location of the calling party.

31. The method of claim 23, further comprising:
blocking caller ID information from being transmitted with the outbound call if a match is not determined.

32. The method of claim 23, wherein the blocking the caller ID information unless a condition is satisfied includes blocking the caller ID information unless a requirement that at least one parameter of the plurality of parameters associated with the matching stored telephone number is satisfied.

33. The method of claim 23, wherein the blocking the caller ID information unless a condition is satisfied includes blocking the caller ID information unless a requirement that all of the plurality of parameters associated with the matching stored telephone number are satisfied.

34. The method of claim 23, wherein the blocking the caller ID information unless a condition is satisfied includes blocking the caller ID information unless a requirement that a security level parameter associated with the matching stored telephone number meets a predefined cut-off level is satisfied.

35. The method of claim 23, wherein the blocking the caller ID information unless a condition is satisfied includes blocking the caller ID information unless an entry of a PIN number is performed.

36. The method of claim 23, wherein the blocking the caller ID information unless a condition is satisfied includes blocking the caller ID information unless a requirement that a geographic position meets a predefined geographic location is satisfied.

37. The method of claim 23, wherein the blocking the caller ID information unless a condition is satisfied includes blocking the caller ID information unless a requirement that a geographic position meets a predefined geographic location and a time of the outbound call is within a certain time interval is satisfied.

38. The method of claim 23, wherein the blocking the caller ID information unless a condition is satisfied includes blocking the caller ID information unless a biometric data requirement is satisfied.

39. The method of claim 23, wherein the blocking the caller ID information unless a condition is satisfied includes blocking the caller ID information unless a requirement that proximity of an enabling device is satisfied.

40. The method of claim 23, further comprising:
if the match is not successful, blocking caller ID information from being transmitted with the outbound call as a default setting.

41. The method of claim 23, further comprising:
if the match is not successful, allowing caller ID information to be transmitted with the outbound call as a default setting.

42. The method of claim 23, wherein the blocking caller ID information includes blocking a telephone number associated with a processor that performs at least one of the steps of receiving, determining and blocking.

43. The method of claim 23, wherein the blocking caller ID information includes blocking location information associated with a processor that performs at least one of the steps of receiving, determining and blocking.

44. The method of claim 43, further comprising:
receiving the location information from a GPS device.

45. A system, comprising:
a processor configured to:
receive a telephone number associated with an outbound call,
determine a match between the telephone number and a stored telephone number in a directory of stored telephone numbers, and
if a match is successful, block caller ID information from being transmitted with the outbound call unless a condition associated with the matching stored telephone number is satisfied, wherein the condition includes a requirement that proximity of an enabling device be satisfied.

* * * * *